Oct. 1, 1940.  G. S. SCHAIRER  2,216,164
ROTARY-WING AIRCRAFT
Filed March 13, 1936  5 Sheets-Sheet 3

INVENTOR.
GEORGE S. SCHAIRER
BY A. E. Wilson
ATTORNEY.

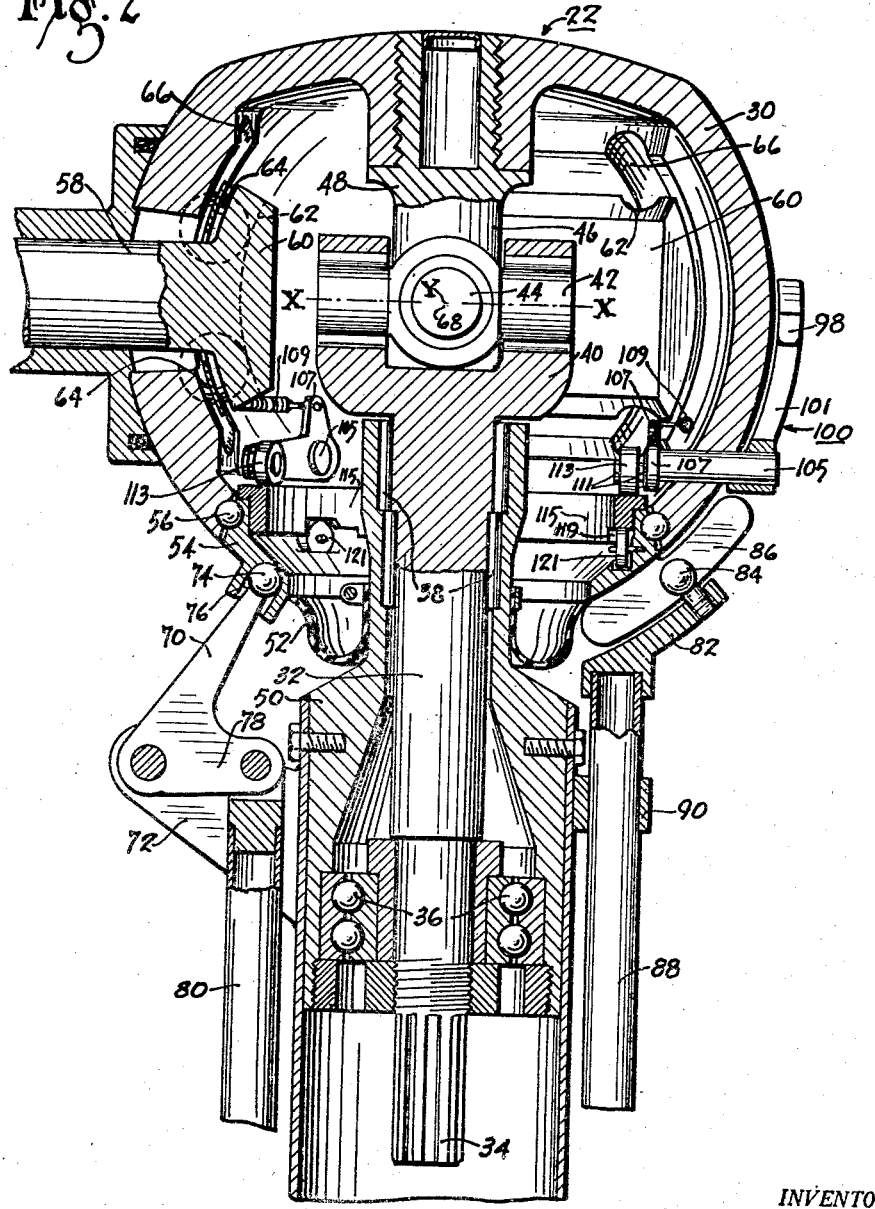

Oct. 1, 1940.  G. S. SCHAIRER  2,216,164
ROTARY-WING AIRCRAFT
Filed March 13, 1936  5 Sheets-Sheet 3
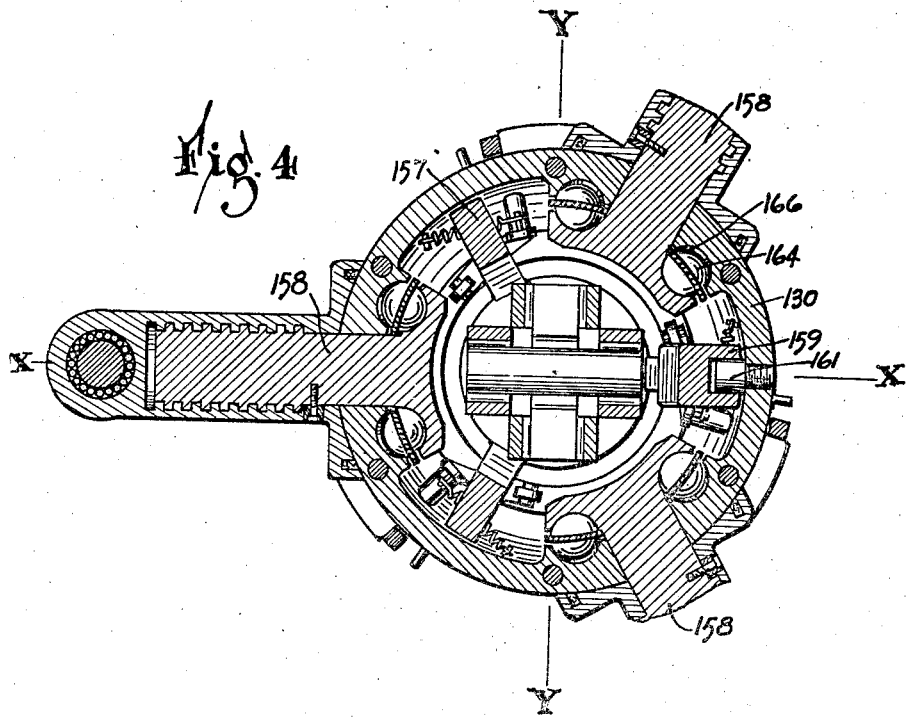
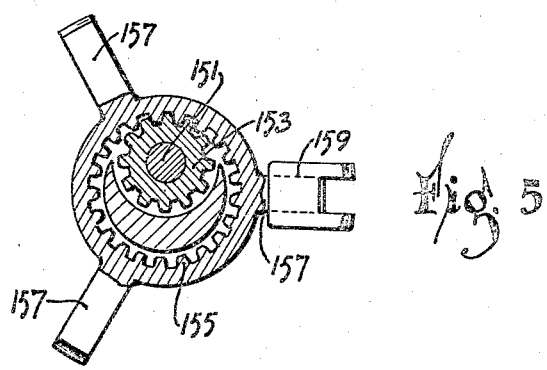
INVENTOR.
GEORGE S. SCHAIRER
BY
ATTORNEY.

Oct. 1, 1940.   G. S. SCHAIRER   2,216,164
ROTARY-WING AIRCRAFT
Filed March 13, 1936   5 Sheets-Sheet 4
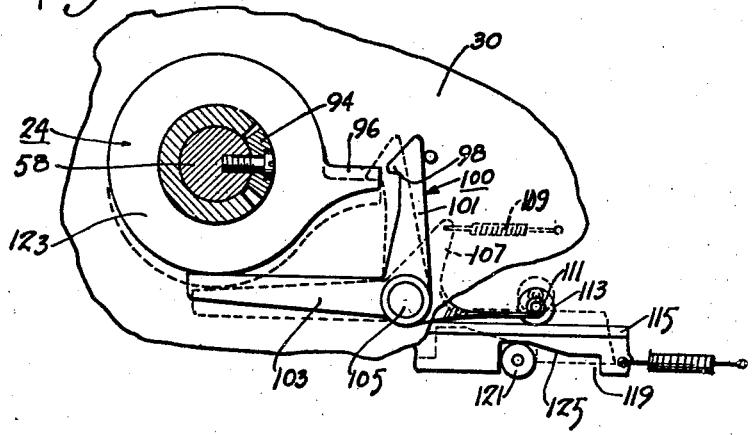
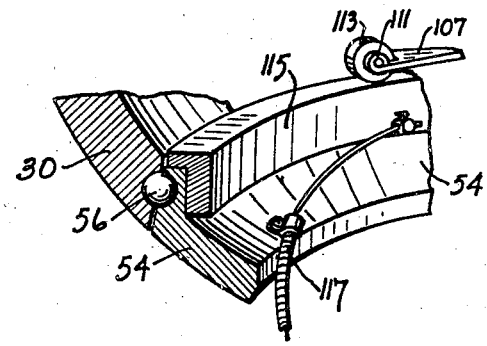
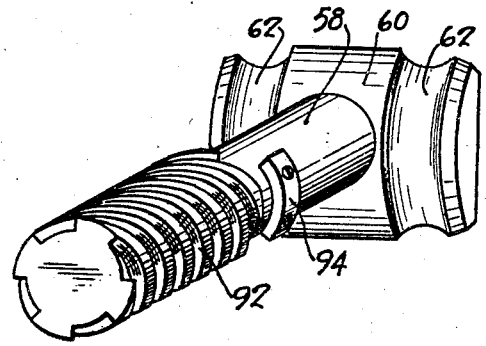
INVENTOR.
GEORGE S. SCHAIRER
BY A. E. Wilson
ATTORNEY.

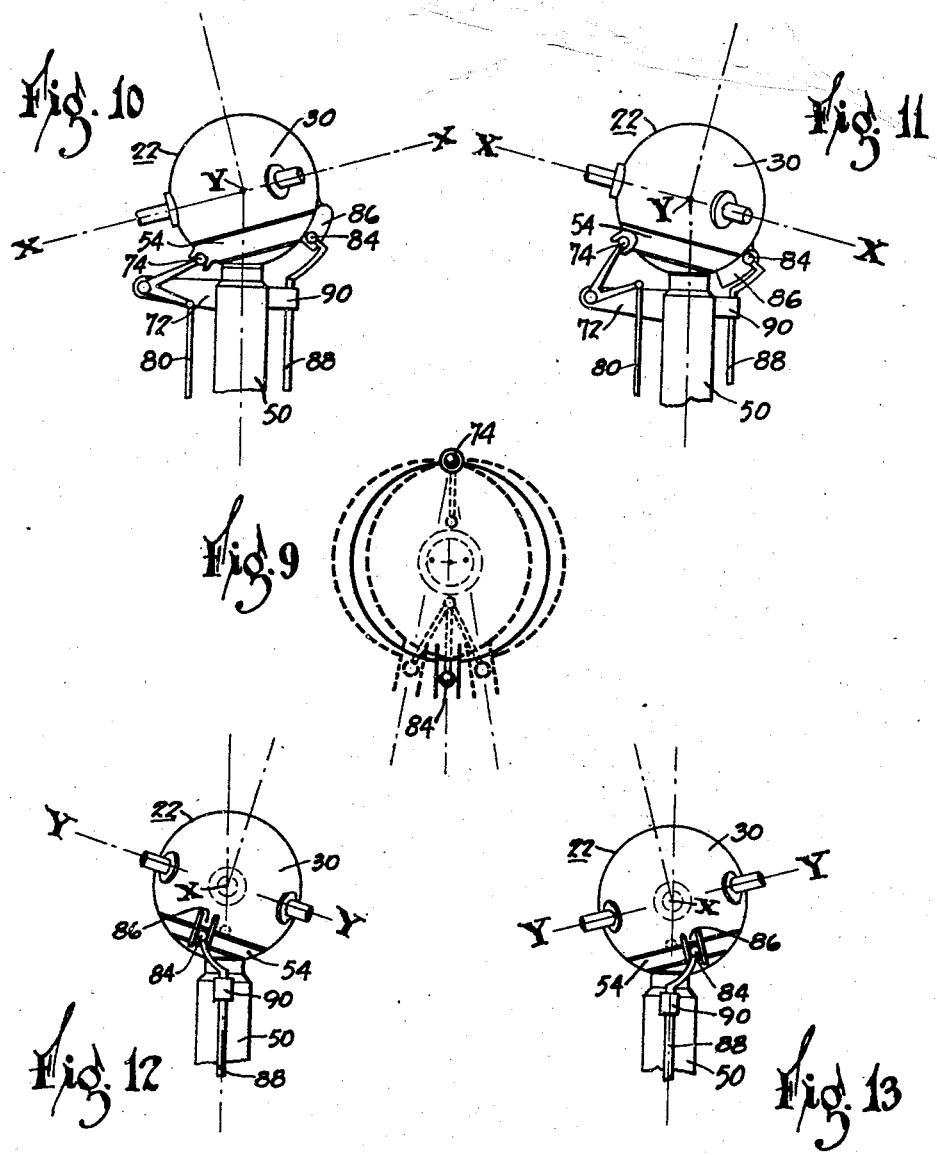

Patented Oct. 1, 1940

2,216,164

UNITED STATES PATENT OFFICE 2,216,164

ROTARY-WING AIRCRAFT

George S. Schairer, South Bend, Ind., assignor, by mesne assignments, to Autogiro Company of America, Willow Grove, Pa., a corporation of Delaware Application March 13, 1936, Serial No. 68,719

33 Claims. (Cl. 244—17)

This invention relates to aircraft, and more particularly to aircraft of the rotary-wing type. This invention is primarily directed to the hub and control means for actuating the rotatable wings of aircraft to obtain the most efficient operation of the craft.

It has been found that to successfully operate aircraft of the rotating vane type, it is desirable that the rotary-wing segments be capable of vertical articulation, and that they be given freedom within certain limits with respect to each other in the rotary direction. This method of attaching the rotating wings to the craft has eliminated the objectionable features encountered when the craft is moving through the air, and the wing moving in the forward direction is subjected to a greater air speed than the wing moving in the rearward direction.

The vertical articulation permits the wing having the greater air speed relative to the ground to be deflected upwardly because of the greater effective lift exerted on that wing surface to thereby decrease the effective lift transmitted to the aircraft by that wing. The wing moving in the rearward direction is deflected downwardly, due to the decrease in air speed and the effect of centrifugal force to exert a force in the vertical direction equal to that exerted by the upwardly swinging wing on the other side of the craft. This vertical articulation of the wings has eliminated the objectionable gyroscopic, rolling and pitching forces exerted by fixed rotary wing structures.

It is desirable that the angle of incidence of the rotating wings be held at a constant value when the wings are rotating in normal flight, and that means be provided to decrease the angle of incidence to enable the rotating wings to be rotated at high speeds prior to "taking off" in order to store up sufficient kinetic energy to permit the aircraft to ascend very rapidly, or vertically. An example of one arrangement of this type appears in copending application Serial No. 738,349, filed August 3, 1934, of Juan de la Cierva, assignor to the assignee of the present application.

It has been found possible to obtain sufficient lift from a rotating wing structure to support the craft without the provision of fixed wings of a conventional type. When such a structure is employed it is necessary that means be provided to change the axis angle of the rotating vanes, both longitudinally and laterally with respect to the fuselage of the craft to steer the craft in flight. An arrangement providing for change of the axis angle is disclosed in copending application Serial No. 645,985, filed December 6, 1932, of Juan de la Cierva, assignor to the assignee of the present application.

It is desirable to construct rotor hubs for rotary-wing aircraft in such a manner that the rotating wings are pivoted for vertical motion about axes intersecting the axis of rotation of the hub to eliminate objectionable vibrations and moments, either when the rotor vanes are operating in the normal position or when the hub is tilted either laterally or longitudinally to vary the direction of flight of the craft.

An object of this invention is therefore to provide a rotor hub wherein novel means are provided to vary the angle between the rotor axis and the longitudinal and lateral axis of the aircraft, as well as to permit vertical articulation of the individual rotor vanes.

A further object of the invention is to provide improved manually operable means for controlling the angle of incidence of the rotor blades to permit the rotating elements to be rotated at high speed to store up a sufficient quantity of kinetic energy to permit the craft to ascend at a very steep angle or vertically.

Another object of the invention is to provide means to pivotally mount the rotary blades in the rotor hub so that the blades may have a limited amount of vertical articulation, rotating about the central point of the rotor hub, and wherein each of the rotor blades is restrained from rotary movement with respect to each of the other blades except about the vertical hinges.

A still further object of the invention is to provide an adjusting mechanism to vary the angle of incidence of each of the rotary blades, wherein stop means are employed to limit the maximum angle of incidence of the blade when in operation.

Another object of the invention is to provide manually operable means to decrease the angle of incidence of the rotor blades, to permit the storing up of kinetic energy in the blades to effect a rapid "take-off" of the craft.

A further object of the invention is to provide novel stop means to control the angle of incidence of the rotor blades, operable to decrease the angle of incidence of the blades as the speed of rotation of the rotor elements is increased, and centrifugal force is thereupon exerted to tend to increase the angle of incidence of the blades.

Yet a further object of the invention is to provide manually operable means to rapidly increase the angle of incidence of the rotor blades of an autogiro when the rotor blades, set at a very small or zero angle of incidence, have reached a desired rotative speed.

Another object of the invention is to provide manually operable control means to decrease the rotor lift before "take-off" and which can hold the blades in their low angle position while stopping the rotation.

A still further object of the invention is to provide novel control means for varying the direction of the rotor axis both longitudinally and laterally with respect to the fuselage of the aircraft to steer the craft.

A further object of the invention is to provide means for supporting the rotary blades when they are not in operation.

A still further object of the invention is to provide novel centrifugally actuated means for controlling the position of the rotor blades under all operating conditions.

Another object of the invention is to provide manually operable means to stop the rotor blades from rotating while the craft is on the ground, regardless of whether power has been supplied to drive the rotor blades or not.

A further object of the invention is to provide means to supply power to drive the rotor to store kinetic energy preparatory to "taking off," and to stop the rotation thereof at will while on the ground.

Another object of the invention is to provide a novel rotor hub for rotary-wing aircraft which may be manufactured economically, and wherein the forces exerted on the hub are exerted at the central point of the hub, thereby minimizing vibrations, and torsional forces to which the hub is normally subjected.

Yet a further object of the invention is to provide novel means for tilting the effective forces of the rotor blades longitudinally and laterally of the aircraft.

Other objects and advantages of this invention will be apparent from the following detailed description, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 1 is a side elevation of an aircraft of the rotary-wing aircraft type, equipped with a device embodying the present invention;

Figure 2 is a vertical section through a rotor hub constructed in accordance with the present invention;

Figure 3 is a view similar to Figure 2 showing a modified form of the invention;

Figure 6 is a diagrammatic view of the pitch limiting mechanism employed in the embodiments of Figures 1 and 3;

Figure 7 is a view illustrating a portion of the manually operable pitch control mechanism of Figures 1 and 3;

Figure 8 is an isometric projection of a rotor blade hub attaching segment;

Figure 9 is a diagrammatic view illustrating a portion of the control means for tilting the hub axis with respect to the aircraft;

Figure 10 is a diagrammatic view illustrating a control means for varying the position of the rotor blades;

Figure 11 is a view similar to Figure 10 showing the parts in a different operative position;

Figure 12 is a view similar to Figures 10 and 11 showing the lateral control mechanism in one operative position; and Figure 13 is a view similar to Figure 12 showing the lateral control means in a different operative position.

Figure 4:
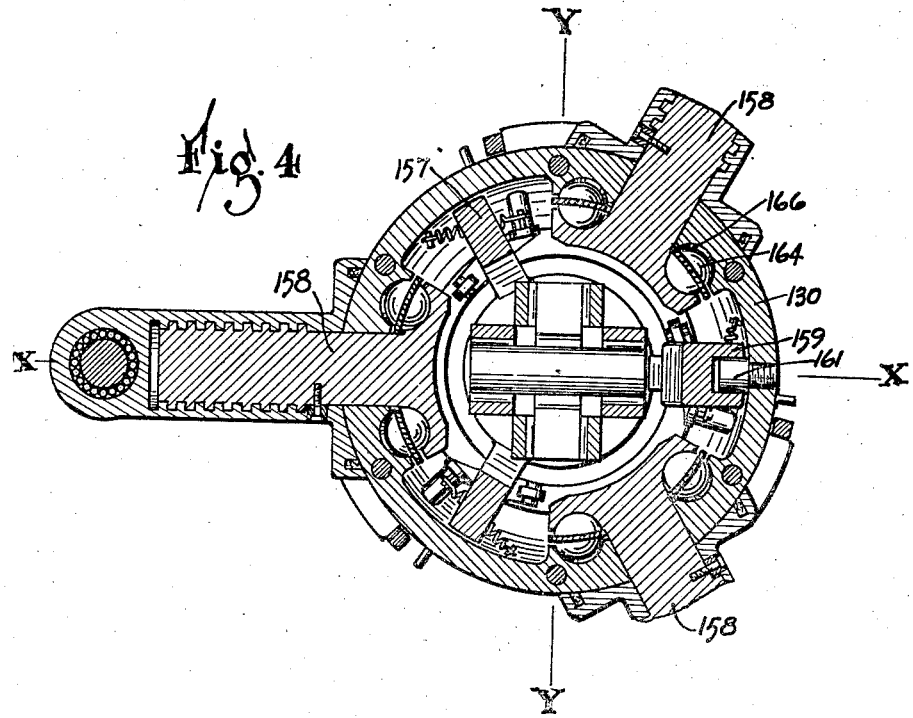
Figure 4 is a view taken on the line 4—4 of Figure 3.
Figure 5:
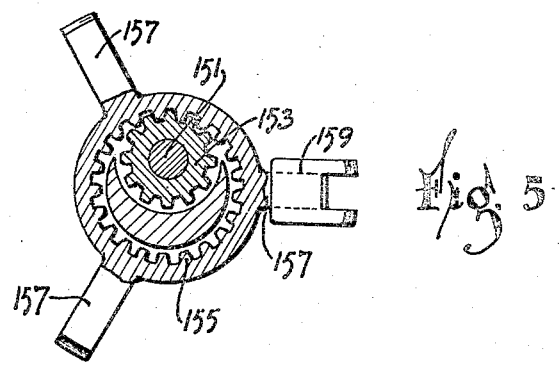
Figure 5 is a view taken on the line 5—5 of Figure 3.

Referring more particularly to Figure 1, there is shown for purposes of illustrating this invention, an aircraft of the rotary-wing type having a fuselage 10 provided with the usual empennage including a rudder 12, and horizontally disposed elevators 14. A landing gear including the wheels 16 and a tail wheel 16' is provided to support the craft on the ground. An engine 18 is provided to drive a vertically disposed propeller 20, and to supply power to a rotor hub 22, to effect rotation of the generally horizontally disposed rotor blades 24.

The rotor hub 22 may be of the type more particularly illustrated in Figure 2, comprising a rotatable shell 30 operably connected to a shaft 32 provided with a splined section 34 adapted to be driven by the engine 18. The shaft 32 may be positioned in thrust bearings 36, and may be guided in needle bearings 38. The upper end of the shaft 32 communicates with a lower segment 40 of a universal joint, through the trunnions 42. Another set of trunnions 44 formed by an upper section 46 of the universal joint cooperate with the trunnions 42 to transmit universal movement of the shaft 32 to a stub shaft 48 fixed to an upper section of the rotatable shell 30.

The rotatable shell 30 is separated from a stationary housing 50 surrounding the shaft 32. The stationary housing 50 is connected by means of a flexible boot 52 to a non-rotating segment 54 separated from the rotatable shell 30 by means such as bearings 56.

The rotatable shell 30 is provided with a plurality of equally spaced apertures designed to receive a plurality of blade shafts 58 (Figure 8). The blade shafts 58 are provided at one end with rounded segments 60 having a plurality of raceways 62 formed therein. A plurality of rollers or balls 64 are received in the raceways 62, and in cooperating raceways 66 formed in the rotatable shell 30. The apertures through the rotatable shell 30 are proportioned to permit vertical oscillation of the blade shafts 58, but to restrain the blade shafts 58 from movement in the tangential direction. It will be observed that the vertical oscillation of the blade shafts 58 are exerted about the midsection 68 of the universal joint.

The rotatable shell 30 may be tilted about the axis YY to vary the angle of the rotor axis longitudinally with reference to the fuselage 10 of the craft by means of a crank 70 fixed to the stationary housing 50 by a support 72. The crank 70 is provided with a knob 74, received in an indentation 76 carried by the stationary segment 54. The crank 70 is provided with an arm 78 operably connected to a rod 80. When the rod 80 is moved vertically the crank 70 is rotated to move the stationary segment 54 and the rotatable shell 30 about the midsection 68 of the joint on the axis YY.

The rotatable shell 30 may be rotated about the axis XX by means of an arm 82 provided with a knob 84 slidably mounted in a groove 86, more particularly illustrated in Figures 12 and 13.

The arm 82 is operably connected to a rod 88, rotatably supported in a bearing 90, fixed to the stationary housing 50. It thus appears that upon rotation of the rod 88, the arm 82 operates through the knob 84 and the side walls of the groove 86 to rock the rotatable shell 30 about the midsection 68 of the joint, upon the axis XX.

A rotor blade of any desirable form, such as that disclosed in my copending application, Serial Number 116,764, filed December 19, 1936, may be attached to the blade shaft 58 in any desirable manner, such as through the helical thread 92. The threads of the helix may be formed at an angle sufficient to overcome frictional forces. It has been found that an angle of approximately fifteen degrees proves satisfactory in this connection. A stop 94 fixed to the blade shaft 58 is provided to limit the maximum allowable angle of incidence of the rotor blade. When the blades 24 are rotating a centrifugal force is exerted on the helical threads 92 tending to unscrew the rotor blades 24, thereby increasing the angle of incidence of the rotor blades until the stop 94 is encountered whereupon the maximum allowed angle of incidence of the rotor blade is effected.

Manually operable means are provided to limit the angle of incidence of the rotor blades when the craft is on the ground, and it is desired to store up kinetic energy in the rotor blades 24 to effect a rapid vertical ascent of the aircraft. This manually operable means comprises a projection 96 (Figure 6) rotatably mounted on the blade supporting shaft 58, adapted to be engaged by a hook 98 carried by a bell crank 100 having arms 101 and 103 rotatably mounted on a shaft 105. The inside end of shaft 105 is provided with a bell crank 107, to one arm of which is fixed a spring or other suitable yielding means 109 to rotate the bell cranks 100 and 107 in the clockwise direction (as shown in Figure 6) and thus move the hook 98 out of engaging position with the projection 96 under normal operating conditions. The other arm of bell crank 107 is provided at its end 111 with a roller 113 adapted to engage, and roll upon a ring 115 rotatably mounted with respect to the stationary segment 54. The bell crank 107 and the operating parts thereof are positioned within the rotatable shell 30. The ring 115 may be manually actuated by means of a Bowden cable and conduit control 117 or other suitable actuating means. The ring 115 is provided with cam surfaces 119 adapted to engage rollers 121 carried by the stationary segment 54.

The arm 103 of the bell crank 100 is positioned so as to be engaged by a member 123 to which the projection 96 is fixed when the blade shafts 58 are moved to the lower position in the apertures through the rotatable shell 30, when the blades 24 are not held in the upper position by centrifugal force. As the blade shafts 58 are thus deenergized, they move to the dotted line position illustrated in Figure 6, whereupon the arm 103 of the bell crank 100 is engaged by the member 123 to rotate the bell crank in the counterclockwise direction, thereby moving the hook 98 carried by the arm 101 into the operative position with respect to the projection 96 carried by the member 123.

In this position the yielding means 109 has been stressed to a predetermined extent, whereupon it is possible for the operator to exert sufficient force through the Bowden control 117 to rotate the ring 115 with respect to the stationary segment 54, to move the ring 115 upwardly through the cam action between the rollers 121 and the inclined surface 125 to limit the rotational movement of the bell crank 100 in the clockwise direction when the force of the rotor blades 24 is removed from it, and the blade shaft 58 moves in the upward direction. The hook 98 then engages the projection 96 and prevents the blade shaft 58 from moving upwardly as viewed in Figure 6.

As power is applied to the shaft 34 to rotate the shell 30, the projection 96 prevents the leading edge of the rotor blades 24 from rising. As increased force is applied the centrifugal force and lift exerted by the rotor blades 24 cause the blade shaft 58 to rise, whereupon a pivotal movement of the rotor blade 24 about the hook 98 is effected to decrease the angle of incidence of the rotor blade. In view of the fact that the angle of incidence of the rotor blades 24 in this position is practically zero and the blades are exerting very little lift, the resistance to high rotative speed is very small. It is therefore possible to rotate the blades at high speeds to build up sufficient kinetic energy to effect a rapid vertical ascent of the aircraft when the blade angle decreasing mechanism is disengaged by actuating the Bowden control mechanism 117 to rotate the ring 115 in the counterclockwise direction as viewed in Figure 7. Upon actuation of the Bowden control the cam surface 125 moves down rollers 121, thereby lowering the projection 111 operably connected to the upper surface of the ring 115 through the roller 113, and permitting the yielding means 109, operably connected through the arm 107, to rotate the bell crank 100 in the clockwise direction to such a position that the hook 98 disengages the projection 96. The angle of incidence of the rotor blades 24, due to the centrifugal force exerted on the blades, is immediately increased, whereupon high lift of the rotor blades is exerted to dissipate the stored kinetic energy and to cause the craft to ascend.

The springs 109 should be of sufficient strength to render it impossible to actuate the ring 115 to restrict the angle of incidence of the rotor blades 24 except at such time as the member 123 acts through the arm 103 to actuate the yielding means 109 on all blades simultaneously. It will be apparent that when the member 123 is lowered to the dotted line position (Figure 6), upon deenergizing of the rotor blades, the hook 98 is moved into the operative position. If the ring 115 is not manually actuated to move it into the restraining position, the hook 98 is immediately moved out of engageable position with respect to the projection 96 when the member 123 again rises due to centrifugal force acting on the rotor blades 24. It is therefore impossible for the angle of incidence of the rotor blades to be restrained except when the craft is on the ground, and the rotor is practically inoperative.

The operation of this device is as follows. Assume that the craft is on the ground, and that it is desired to effect a "take-off." In order to rotate the rotor blades 24 at high speed to store sufficient kinetic energy therein to effect a rapid "take-off," it is necessary to actuate the pitch limiting device so that the rotor blades 24 may be operated as a flywheel. The pilot manipulates the Bowden control 117 to rotate the ring 115 to effect hooking engagement between the hook 98 and the projection 96. The engine 18 is then started, and a control mechanism is actuated to divert the power of the engine to drive the shaft 32. The shaft 32 drives the rotatable shell 30, thereby actuating the rotor blades 24. As the blades 24 are rotated, centrifugal force and lift acting thereon tends to elevate the blades to the horizontal position. As the blades are thus elevated the projection 96 (Figure 6) engaging the hook 98 forces the member 123 to rotate in the clockwise direction with reference to the blade shafts 58, thereby decreasing the angle of incidence of the rotor blades 24. When the blades 24 have reached a given predetermined speed, the pilot actuates the Bowden control 117 to rotate the ring 115 in the clockwise direction as viewed in Figure 7. The hook 98 is then moved out of engagement with the projection 96, and centrifugal force acting on the rotor blades 24 causes the blades to rotate on helical threads 92 to the blade high angle position determined by stop 94. The rotor blades 24 then exert a high lift effect which causes the craft to elevate at a very steep angle or vertically. The power of the engine 18 is then declutched from the rotor blades 24, and drives the vertically disposed propeller 20 to move the craft horizontally through the air.

To steer the craft in the vertical direction, that is to gain or lose altitude, the pilot actuates the rod 80 to move the crank 70 which acts through the knob 74 and the indentation 76 to move the rotatable shell 30 about the axis YY of the universal joint. The vertical force exerted by the rotor blades 24 is thus employed to direct the craft either in the climbing or driving aspect.

To steer the craft in the lateral direction, the pilot manipulates the controls to rotate the rod 88, which acts through the arm 82, the knob 84, and the side walls forming the groove 86 to move the rotatable shell 30 about the axis of the axis XX of the universal joint. It will be observed that the rotatable shell 30 during this operation is restrained by the crank 70 from moving in a different direction.

It will be apparent of course that the rods 80 and 88, which operate to steer the craft about both the longitudinal and lateral axes of the craft may be suitably connected to any desired control means accessible to the pilot to effect the desired operation.

The embodiment illustrated in Figure 3 is similar in many respects to the embodiment of Figure 2. The corresponding parts have therefore been given similar reference numerals with the addition of 100. It will be observed in this embodiment that a drive shaft 151 projects through the stationary housing 150, and is fixed to a driving pinion 153 operably connected to drive a gear 155 having equally spaced projections 157 extending between the blade shafts 158. One of the projections 157 is provided with a bifurcated member 159, adapted to engage a stud 161 fixed in the rotatable shell 130. The stub shaft 148 operably connected to the trunnion 144 of the universal joint is separated from the rotatable shell 130 by needle bearings 163. Horizontally disposed thrust bearings 165 are positioned between the rotatable shell 130 and a cap 167 operably connected to the stub shaft 148.

The operation of this embodiment of the invention is similar in many respects to the embodiment illustrated in Figure 2. It will be observed, however, that the drive shaft 151 operates through the projections 157 extending between the blade shafts 158 to drive the rotatable shell 130 to the stud 161. In this embodiment the universal joint does not rotate with the rotatable shell, but is fixed with respect to the cap 167 separated from the rotatable shell 130 by the thrust bearings 165.

The method of controlling the angle of incidence of the rotor blades, and the means for steering the craft are the same in this embodiment as that illustrated in Figure 2.

It will be apparent, of course, that various types of bungee devices may be attached to the controls, or to the ring 54 to equalize the forces exerted on the controls.

While the invention has been described with particular reference to two particular embodiments, it is not intended to limit the scope of the invention to the embodiments illustrated and described, as many changes may be made in specific elements of the structure without departing from the spirit of the invention as defined by the following claims.

I claim:

1. A rotor hub for rotary-wing aircraft having a rotatable shell having apertures therein, means to tilt the rotatable shell in two planes about a common center, and a plurality of rotor blades with their root ends extending through the apertures in the rotatable shell and free to oscillate vertically relative to the shell about said center.

2. In a rotor hub for rotary-wing aircraft, a rotatable shell having a plurality of vertically elongated apertures, a plurality of rotor blade supports extending through the apertures, and means including generally circular vertically disposed raceways between the supports and the rotatable shell to permit vertical displacement of the blade supports with reference to the rotatable shell.

3. In a rotor hub for rotary-wing aircraft, a rotatable shell having a plurality of vertically elongated apertures, a plurality of rotor blade supports extending through the apertures, means including generally circular vertically disposed raceways between the supports and the rotatable shell to permit vertical displacement of the blade supports with reference to the rotatable shell, means associated with the blade supports to vary the angle of incidence of the rotor blades, stop means associated with the blade supports to limit the maximum and minimum angle of incidence of the rotor blades, manual means operable when the rotor blades are in the lowest vertical position to limit the angle of incidence of the rotor blades and manually operable means to release the angle limiting means.

4. In rotary-wing aircraft, a rotor hub including a rotatable shell, power means to drive the rotatable shell, a plurality of rotor blades, means associated with the rotor blades and the rotatable shell to permit vertical articulation of the rotor blades about the center of the rotatable shell, manually operable means to tilt the rotatable shell about substantially perpendicular axes intersecting at approximately the center of the rotatable shell, and manually operable means associated with said second named means to restrict the angle of incidence of the rotor blades under certain operating conditions, and manually operable means to release the incidence angle restraining means at will.

5. A rotor blade attaching segment for rotary-wing aircraft including a helically threaded shank member, an abutment fixed to the shank member to restrict rotation of the rotor blade in two directions, and a generally arcuate shaped base member fixed to the shank member and having spaced parti-circular raceways on each side of the shank member 6. A rotor hub for a rotary-wing aircraft, and a fixed support, means to tilt the rotatable shell about substantially perpendicular axes intersecting at the center of the shell, a non-rotatable ring associated with the rotatable shell, bearing means between the rotatable shell and non-rotatable ring, means including a vertically reciprocal rod and a crank pivoted on the fixed support and having an arm engaging the non-rotatable ring to tilt the rotatable shell about one of said axes, and means including a rotatable rod and a crank having an arm engaging in a groove in the non-rotatable ring to move the rotatable shell about the other of said axes.

7. In rotary-wing aircraft, a rotor hub including a rotatable shell, a non-rotatable ring, a plurality of rotor blades, connecting means including a plurality of vertically movable members between the blades and the shell, means associated with the connecting means to vary the angle of incidence of the rotor blades, stop means operable when the connecting means are moved to one extreme position to limit the angle of incidence of the rotor blades, and manually operable means including a ring rotatably mounted on said non-rotatable ring to move said stop means into operative position to decrease the angle of incidence of the rotor blades.

8. In rotary-wing aircraft, a rotor hub including a rotatable shell, power means to drive the rotatable shell, a non-rotatable ring, anti-friction means between the shell and ring, a plurality of rotor blades, connecting means including a plurality of vertically movable members between the blades and the shell, means associated with the connecting means to vary the angle of incidence of the rotor blades as they rise, stop means including a projection carried by the connecting means and a hook yieldingly urged toward the disengaging position operable when the connecting means are moved to the lower position to limit the angle of incidence of the rotor blades, manually operable means including a ring rotatably mounted on said non-rotatable ring to move said hook into operative position with said projection to decrease the angle of incidence of the rotor blades when the rotatable shell is driven by the power means, and manually operable means to rotate said rotatable ring to move the hook out of engaging position with the projection.

9. In a rotor hub for rotary-wing aircraft, a rotatable shell having a plurality of apertures, a plurality of rotor blades extending through the apertures, and means including raceways between the blades and the rotatable shell to permit vertical oscillation of the blades with reference to the rotatable shell.

10. In a rotor hub for rotary-wing aircraft, a rotatable shell having a plurality of apertures, a plurality of rotor blades extending through the apertures, and means including raceways between the blades and the rotatable shell to permit vertical oscillation of the blades about a common center with reference to the rotatable shell.

11. In a rotor hub for rotary-wing aircraft, a rotatable shell having a plurality of apertures, a plurality of rotor blades extending through the apertures, means to permit vertical displacement of the blades about a common center with reference to the rotatable shell, means associated with the blades to vary the angle of incidence of the rotor blades, and stop means associated with the blades to limit their maximum angle of incidence.

12. In a rotor hub for rotary-wing aircraft, a rotatable shell, a plurality of rotor blades, means including raceways between the blades and the rotatable shell to permit vertical displacement of the blades with reference to the rotatable shell, means associated with the blades to vary their angle of incidence, stop means associated with the blades to limit the maximum and minimum angles of incidence of the blades, manual means operable when the rotor blades are in the lowest vertical position to limit the angle of incidence of the rotor blades, and manually operable means to release the angle limiting means.

13. A rotor blade attaching segment for rotary-wing aircraft including a shank member, an abutment fixed to the shank member to restrict rotation of the rotor blade in two directions, and a generally arcuate shaped base member fixed to the shank member and having spaced parti-circular raceways on each side of the shank member.

14. A rotor blade attaching segment for rotary-wing aircraft including a shank member, and a generally arcuate shaped base member fixed to the shank member and having spaced parti-circular raceways on each side of the shank member.

15. In rotary-wing aircraft, a rotor hub, a rotor blade attaching segment comprising a shaft member, a blade angle limiting stop member fixed to the shaft, and a base member fixed to the shaft member and provided with spaced raceways on opposite sides of the shaft member toward the inboard end thereof for connecting the blade with the hub.

16. In an aircraft sustaining rotor, a blade, a hub, and pivot mechanism connecting the blade with the hub including a concave bearing surface offset from the hub axis and curved about a center point lying on the axis of the hub and extended at an angle to the longitudinal blade axis, a cooperating convex bearing shoe adapted to ride on said surface, and cooperating guide means for preventing relative angular movement of the bearing surface and shoe about an axis substantially coinciding with the longitudinal blade axis.

17. In an aircraft sustaining rotor, a blade, a hub, and pivot mechanism connecting the blade with the hub including a bearing surface offset from the hub axis and curved about a center point lying on the axis of the hub, a cooperating bearing shoe adapted to ride on said surface, and means providing freedom for tilting of the rotative hub substantially about said point.

18. For an aircraft sustaining rotor, a support, a non-rotative hub member mounted for pivotal movement on the support about a predetermined point, a cooperating hub member mounted for rotation upon the non-rotative hub member about an axis passing through said pivot point, an arcuate trackway carried by the rotative hub member, the arcuate trackway being curved about said pivot point as a center, a blade, and bearing means associated with the blade and adapted to ride on the arcuate trackway.

19. For an aircraft sustaining rotor, a support, a non-rotative hub member mounted for pivotal movement on the support about a predetermined point, a cooperating hub member mounted for rotation upon the non-rotative hub member about an axis passing through the said pivot point, an arcuate trackway carried by the rotative hub member, the arcuate trackway being curved in a generally vertical plane about said pivot point as a center, a blade, and bearing means associated with the blade and adapted to ride on the arcuate trackway.

20. In an aircraft sustaining rotor, an upright rotatable hub, a plurality of rotor blades radiating therefrom, a tiltable mounting for the hub providing for rocking thereof about a point located substantially on the axis of rotation, and mounting mechanism for each blade located approximately in the vertical plane containing the longitudinal blade axis and offset from the hub axis but configured to provide for up and down flapping of the blade about a virtual axis intersecting said point.

21. In a rotor hub for a rotary-wing aircraft, a rotatable shell, a plurality of rotor blades vertically articulated to the rotatable shell to permit limited vertical movement of the rotor blades with respect to the rotatable shell about a common point within said shell, and manually controllable means including a device operative under the influence of upward articular movement of the rotor blades to reduce the angle of incidence of the blades.

22. In an aircraft sustaining rotor, an upright rotatable hub, a plurality of rotor blades radiating therefrom, a tiltable mounting for the hub providing for rocking thereof about a point located substantially on the axis of rotation, and mounting mechanism for each blade located approximately in the vertical plane containing the longitudinal blade axis and offset from the hub axis in a direction paralleling the blade axis but configured to provide for up and down flapping of the blade about a virtual axis intersecting said point.

23. In an aircraft sustaining rotor, a blade, a hub, and pivot mechanism connecting the blade with the hub including a concave bearing surface of parti-circular shape formed on the hub and offset from the hub axis, said surface being curved about an axis intersecting the axis of the hub and extended in a direction generally transverse the longitudinal blade axis, a convex bearing shoe connected with the blade and adapted to cooperate with said surface to provide freedom for pivotal blade movement, and means providing against relative movement of said surface and said shoe about the longitudinal axis of the associated blade.

24. In a bladed aircraft sustaining rotor, a rotative hub part, a rotative driving part concentric therewith, means providing freedom for tilting of said rotative hub part with respect to the driving part, and a flexible connection between said parts including a pair of spaced shoes on one of said parts paralleling a radial plane containing the rotor axis, and a cooperating driving member on the other of said parts projecting between said pair of shoes.

25. In sustaining rotor construction for aircraft, a rotatable hub member, a rotor blade, means movably mounting the blade on the hub member whereby the blade may occupy varying positions thereon to minimize undesirable forces in flight, a non-rotating hub supporting structure, a rotatable spindle carried thereby, a torque-transmitting universal joint mounting said hub member on said spindle for tilting of the hub axis in all directions, manually controllable mechanism supported on said non-rotating hub supporting structure and operatively coupled to said hub member by means which accommodate relative rotation between said mechanism and the hub, and means for coupling said spindle to a source of power for driving the rotor through said universal joint.

26. In sustaining rotor construction for aircraft, a rotatable hub member, a rotor blade, means movably mounting the blade on the hub member upon a pivot axis intersecting the hub axis whereby the blade may occupy varying positions thereon to minimize undesirable forces in flight, a non-rotating hub supporting structure, a rotatable spindle carried thereby, a torque-transmitting universal joint centered at the point of intersection of the hub axis and said blade pivot axis and mounting said hub member on said spindle for tilting of the hub axis in all directions, manually controllable mechanism supported on said non-rotating hub supporting structure and operatively coupled to said hub member by means which accommodate relative rotation between said mechanism and the hub, and means for coupling said spindle to a source of power for driving the rotor through said universal joint.

27. In a bladed aircraft sustaining rotor, a non-rotating hub support, a hub member rotatably and tiltably mounted on said support, mechanism connecting a blade with the hub member including means providing freedom for swinging movement of the blade in a direction generally transverse the mean rotative path of travel thereof, and mechanism for controllably tilting the hub member including a non-rotating ring journalled thereon and a control link member having a mounting on said non-rotating support and connected with said ring.

28. In a bladed aircraft sustaining rotor, a non-rotating hub support, a hub member rotatably and tiltably mounted on said support, mechanism connecting a blade with the hub member including means providing freedom for swinging movement of the blade in a direction generally transverse the mean rotative path of travel thereof, a non-rotating ring journalled on the hub member and tiltable therewith, controllable means for tilting said ring and thus the hub member, and restraining means accommodating such tilting and connected to said hub support to prevent rotation of said ring with said hub member.

29. In a bladed aircraft sustaining rotor, a rotatable hub member, mechanism connecting a blade with the hub member with freedom for swinging movement in a direction generally transverse the mean rotative path of travel thereof and with freedom for pitch change movement of the blade, means operative under the influence of centrifugal force for moving the blade from a lower to a higher pitch position, and a device associated with the root end of the blade and the hub and operative under the influence of swinging movement of the blade from a lower to a higher position to move the blade from a higher to a lower pitch position.

30. In a bladed aircraft sustaining rotor, a rotatable hub member, mechanism connecting a blade with the hub member with freedom for swinging movement in a direction generally transverse the main rotative path of travel thereof and through a range extending downwardly below a position approximately perpendicular to the axis of rotation, the mounting mechanism further providing freedom for pitch change movement of the blade through a range extending upwardly from approximately zero pitch, and a device associated with the root end of the blade and the hub and operative under the influence of upward swinging movement of the blade in the range aforesaid to move the blade from a positive to substantially zero pitch position.

31. In an aircraft sustaining rotor, a rotative hub member, a variable-pitch sustaining blade, mechanism connecting the blade to the hub member with freedom for swinging movement in a direction generally transverse the mean rotative path of travel thereof through a range which includes an approximately radial blade position, and means acting by virtue of blade swinging movement to said position to alter its effective pitch to approximately zero lift.

32. In an aircraft sustaining rotor, a rotative hub member, a variable-pitch sustaining blade, mechanism connecting the blade to the hub member with freedom for swinging movement in a direction generally transverse the mean rotative path of travel thereof through a range which includes an approximately radial blade position, means acting by virtue of blade swinging movement to said position to alter its effective pitch to approximately zero lift, and a manual control for rendering said means ineffective.

33. In an aircraft having a bladed sustaining rotor, a hub structure including a non-rotative hub supporting member and a rotative hub member to which a blade of the rotor is connected, means providing freedom for tilting of the rotative hub member with respect to the non-rotative hub member, and mechanism for driving the rotor including rotative transmission parts journalled in fixed relation to the non-rotative hub member, and drive means interconnecting said parts and the rotative hub member and incorporating a flexible connection accommodating tilting movement of the rotative hub member.

GEORGE S. SCHAIRER.

CERTIFICATE OF CORRECTION.

Patent No. 2,216,164. October 1, 1940.

GEORGE S. SCHAIRER.

It is hereby certified that error appears in the printed specification of the above numbered patent requiring correction as follows: Page 5, first column, line 1, claim 6, after "aircraft," insert the words --including a rotatable shell--; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.